Oct. 5, 1971 I. PEJCHA 3,610,050

MECHANICAL INTERLOCK MECHANISM FOR A CARRIAGE ASSEMBLY

Filed Jan. 19, 1970 3 Sheets-Sheet 1

INVENTOR
IVAN PEJCHA

BY Nathan N. Kallman

ATTORNEY

MECHANICAL INTERLOCK MECHANISM FOR A CARRIAGE ASSEMBLY

Filed Jan. 19, 1970 3 Sheets-Sheet 2

INVENTOR
IVAN PEJCHA

BY Nathan N. Kallman

ATTORNEY

Oct. 5, 1971 I. PEJCHA 3,610,050

MECHANICAL INTERLOCK MECHANISM FOR A CARRIAGE ASSEMBLY

Filed Jan. 19, 1970 3 Sheets-Sheet 3

INVENTOR
IVAN PEJCHA

BY Nathan N. Kallman

ATTORNEY

United States Patent Office 3,610,050

Patented Oct. 5, 1971

3,610,050

MECHANICAL INTERLOCK MECHANISM FOR A CARRIAGE ASSEMBLY

Ivan Pejcha, Santa Clara, Calif., assignor to International Business Machines Corporation, Armonk, N.Y.

Filed Jan. 19, 1970, Ser. No. 3,695
Int. Cl. G05g *17/00*
U.S. Cl. 74—2 12 Claims

ABSTRACT OF THE DISCLOSURE

A solenoid operated, spring biased, pivotable arm prevents a magnetic head carriage from leaving a home position when the power is off but frees movement of the same when power is on. Additionally, in case of electrical power failure, the pivotable arm is released by the solenoid to permit the carriage to be driven to the home position through stored energy.

BACKGROUND OF THE INVENTION

Field of the invention

This invention relates to magnetic transducer apparatus, and more particularly, to the carriage mechanism which moves the magnetic transducer heads into and out of a disk pack for positioning the transducer heads relative to the disks.

Description of the prior art

Conventionally, an actuator device causes reciprocating movement of the carriage carrying one or more transducers or heads to a plurality of operative positions with respect to one or more disks. When in an operative position, the heads are maintained close to but spaced from their associated disk surfaces by an air film generated by rotation of the disks relative to the heads. In order to avoid contact between a head and a disk surface, it is important that the heads be positioned away from the disk surfaces when the disks are not rotating at a speed sufficient to generate the required air bearing for support of the heads. This non-support condition may occur prior to start-up of the drive, or in case of an electrical failure during drive operation, which would cause the disks to stop rotating.

The prior art disk drive devices employ heads which are mechanically or electromechanically loaded toward the disk surfaces. In these devices, the problem of head-disk contact or "head crash" is solved by interlock devices or circuits which prevent loading of the heads until the disks have reached the speed required to generate the necessary air bearing, and by the use of automatic head unloading devices, responsive to electrical failure or other event which would lead to stoppage of disk rotation, for unloading the heads from their position adjacent the disk surfaces.

Such devices are satisfactory for heads which employ external means for loading the heads toward the disk surfaces, but a different problem is presented when self-loading heads are employed, such as disclosed and claimed in copending application Ser. No. 722,007, filed Apr. 17, 1968, and assigned to the same assignee as the present application. In such self-loading devices, loading is accomplished by means of a spring member built into each head mounting arm, which urges the head towards the associated disk surface to assume a flying position. Unloading of such heads is accomplished by stationary cam means which cooperate with sloping surfaces of the head arm to unload the heads when they are withdrawn from the disk surfaces. These heads are automatically loaded shortly after the carriage leaves the home position and remain loaded until the carriage is returned to the home position.

In this situation, there is no means for unloading the self-loading heads without returning the carriage to the home position, so that it is necessary, in the event of electrical failure or other cause of disk rotation stoppage, to quickly return the carriage to the home position to prevent head-to-disk contact with consequent damage to one or both elements.

SUMMARY OF THE INVENTION

This invention is directed to a mechanical interlock mechanism for controlling the position of a head carriage with respect to a disk assembly so as to prevent the carriage from moving into the disk assembly unless the disks are operating at the required speed, and to retract the carriage mechanically out of the disk assembly when the disk speed drops below the required level and the electromagnetic system for any reason fails to do so. The carriage is driven along a straight line between the home position, remote from the disk assembly, and an operative position within the disk area. A pivotable interlock arm is driven in one direction by spring means and in the opposite direction by solenoid operation. The carriage includes a detent notch portion for securing the carriage in home position. The arm normally engages the detent notch, in the home position, when the power is off and the solenoid de-energized. With power on and the solenoid energized, the arm disengages from the detent notch to allow the driving means to move the carriage freely. A glider is provided for urging the carriage to the home position when required, and after the electromagnetic system fails to do so.

More specifically, the glider is guided by two slots for movement along the path of the carriage to drive the carriage toward the home position and includes a detent cam portion which is engaged by the opposite end of the pivotable arm to normally prevent movement of the glider. Upon release, the glider engages the carriage to effect movement of the carriage toward the home position. The glider is coupled to a constant torque negator motor by means of a cable so that the motor stores energy as the cable is wound out during movement of the carriage and glider away from the home position and into glider latch position with the carriage detenting end of the arm, which is the end closer to the home position.

In accordance with one feature of the present invention, the negator motor supplies different forces for the carriage return movement as a function of carriage position. This difference in applied forces is to compensate for the varying force required to return the carriage to the home position. When the carriage is in a position with the heads in operative relationship with the disk surfaces, only a relatively small force is required to produce movement of the carriage toward the home position, this force being primarily that required to overcome the low friction of the carriage on its associated guideways. However, as the carriage approaches the home position, the sloping portions of the head arms will encounter the cam members which produce the unloading of the heads, as discussed above. With a plurality of such heads and arms associated with a given actuator, the force required to move the arms against the cams to produce this camming action is sharply increased relative to that required to produce carriage motion alone. Thus, in the present invention the negator motor provides one relatively low force for producing carriage travel toward the home position, and then a considerably larger force just before the carriage reaches home position, to provide the force required to produce the camming action for unloading the head. In one embodiment, this dual force may be supplied by a negator motor having a drum which provides two different radii for winding the cable, the larger radius portion providing the relatively lower force required for carriage motion at intermediate positions relative to the home position, and the smaller radius portion, with its resultant higher force, being utilized to produce the relatively higher force required to drive the carriage to the home position, including the camming action required to unload the heads.

DESCRIPTION OF THE PREFERRED EMBODIMENT

Figure 1:
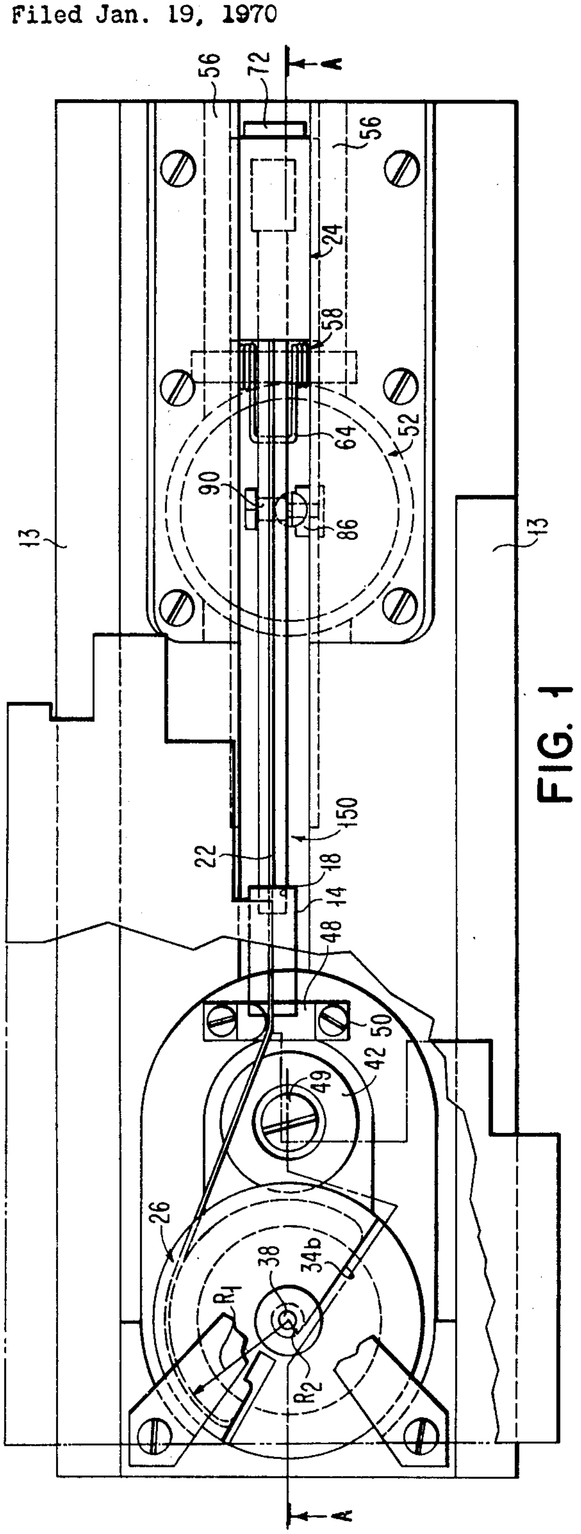
FIG. 1 is a top plan view of a portion of the apparatus illustrating the reciprocating carriage and the mechanical interlock mechanism forming a preferred embodiment of the present invention.

Referring to the drawings, the present invention is directed to a mechanical interlock mechanism 10 for controlling the positioning of a carriage 12 carrying magnetic heads (not shown) toward and away from a disk assembly (not shown). The carriage 12 is driven bi-directionally, between left and right, the carriage 12 being supported for such movement principally by rails 13.

The carriage and driving motor are not shown in the drawings, but they may be of any suitable type such as that described and claimed in co-pending application Ser. No. 716,968, filed Mar. 28, 1968, and assigned to the same assignee as the present application. The carriage which reciprocates from home position on the left to right has depending therefrom a carriage ramp portion 14 including an inclined ramp surface 16 on the end facing home position. The ramp portion 14 terminates at its lower end in a rectangular detent notch 18, and is further provided with a longitudinally extending slot 20 through which extends a flexible cable 22 having its outboard end coupled to glider 24 and its inboard end wound around a transmission cam 34, part of a relatively large drum 26. In this respect, these elements of the mechanism are supported by a rigid frame member 30 which in turn is mounted on a base 32. Preferably the rails 13 act as parallel guides for the reciprocating carriage 12.

A negator motor 28 that supplies different forces for the carriage movement may comprise a spring 46, wound in a conventional way between drum 26 and a smaller drum 42, rotatably supported by a fixed shaft 44. A transversely extending V-shaped plate 36 is positioned on frame member 30 to support the upper end of a shaft 38, which in turn supports the freely rotatable drum 26. The lower end of the shaft 38 is threaded and engaged with a tapped hole 40 which rigidly locates the shaft and thus the axis of drum 26. To minimize frictional effects and thus improve efficiency, a low friction insret 35 made of oilite, for example, is pressed into the coil spring 46. Preferably, the inner diameter of such insert is formed as small as possible.

The coil spring 46 couples the negator motor drum 26, such that when the cable 22 is played out, by movement of the glider from left to right, the steel spring 46 automatically unwinds from the negator drum 42 and winds on to the large drum 26. Upon release of the glider 24 and return to home position of the carriage 12, the cable 22 is wound up on the cam 34 by the energy stored in the spring 46 as it winds back on drum 42.

Figure 2:
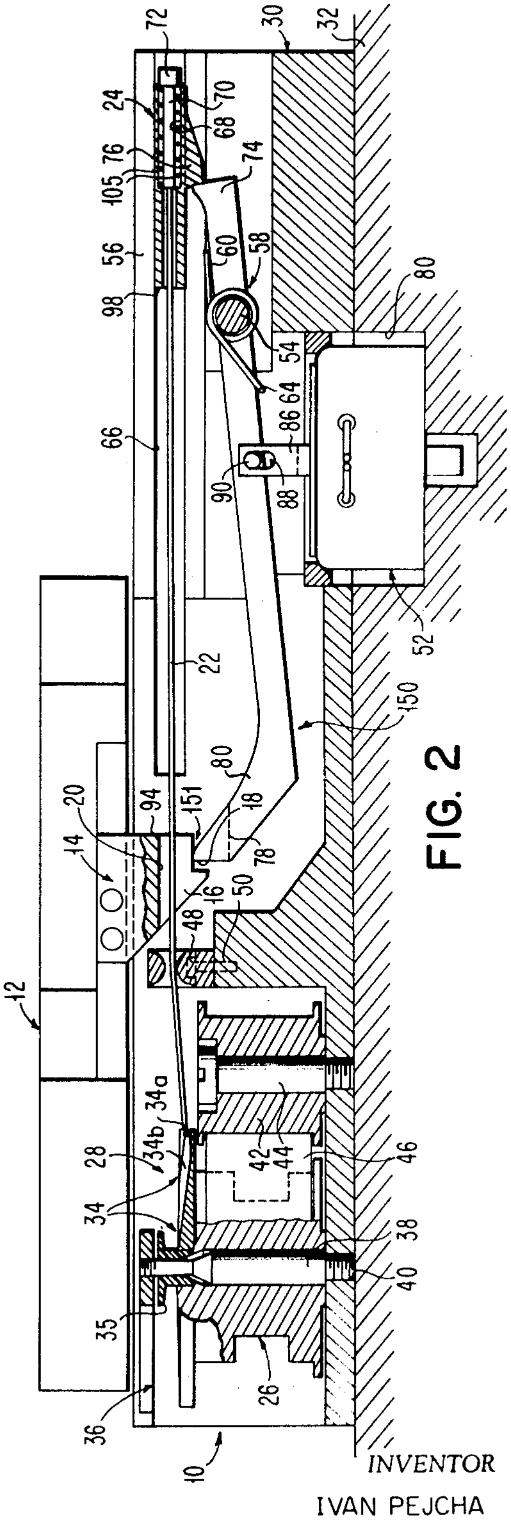
FIG. 2 is an elevational view, in section, of the mechanism in FIG. 1 taken about line A—A, with the carriage drive means and the solenoid de-energized.
Figures 3, 4:
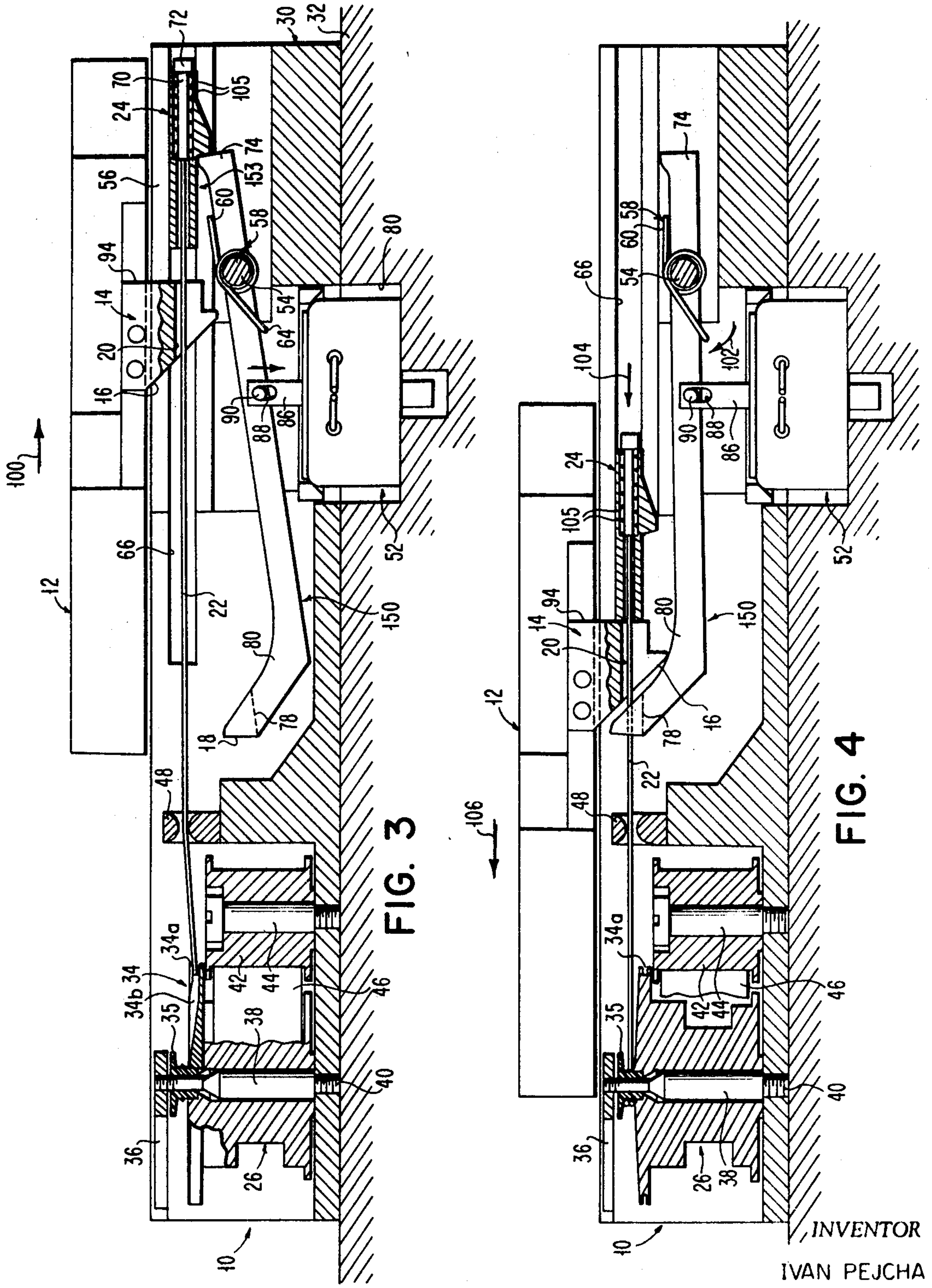
FIG. 3 is a sectional, elevational view similar to that of FIG. 2, during normal operation, with the solenoid energized.
FIG. 4 is a sectional, elevational view similar to that of FIGS. 2 and 3, upon de-energization of the electrical system.
Figure 5:
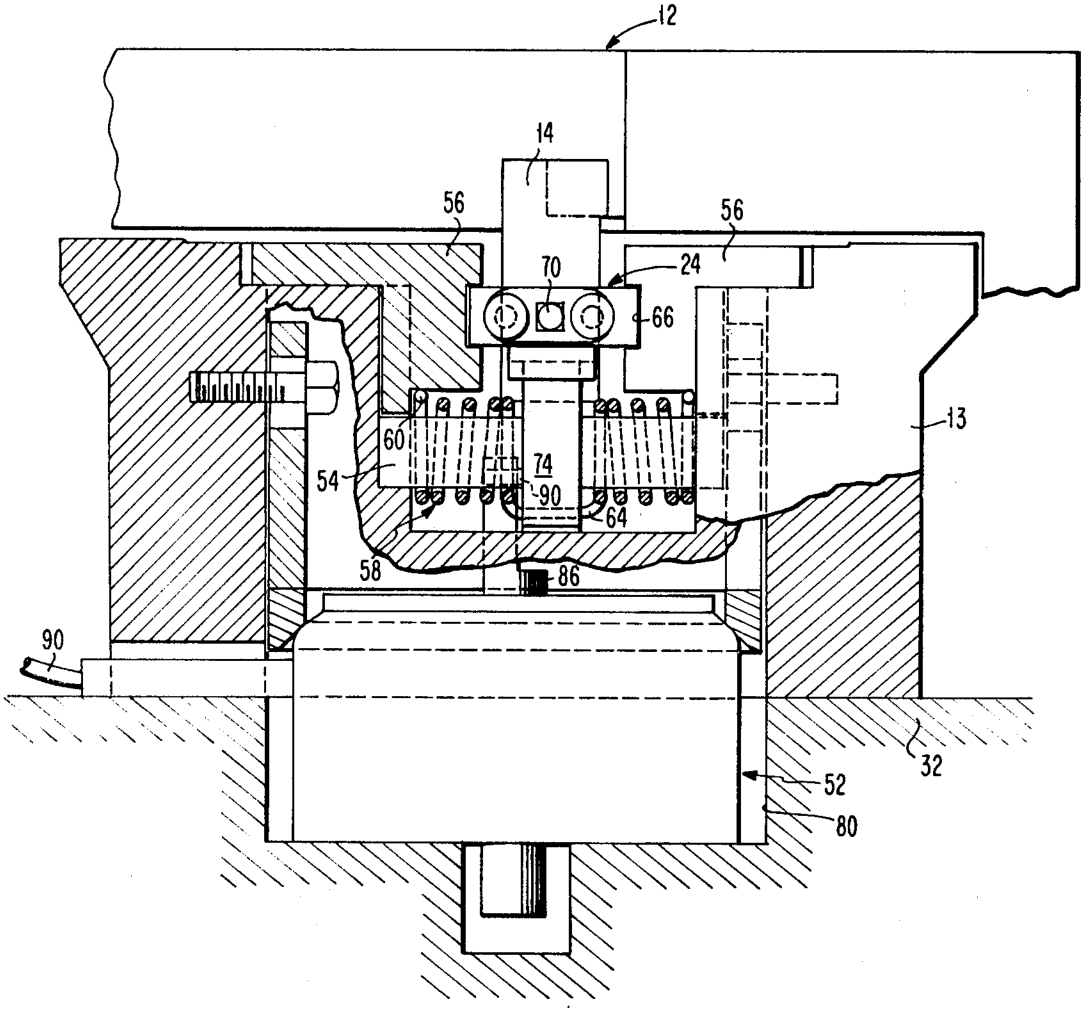
FIG. 5 is a rear elevational view, partially in section, of the apparatus of FIG. 1.

Cam member 34 provides the two effective radii for cable 22 as a function of carriage position. The end of cable 22 engages an opening in cam 34, and cable 22 rides in a slot **34*a* which extends around a portion of the outer periphery of cam 34. Thus, while cable 22 is in slot 34a, as shown in FIGS. 1, 2 and 3, cable 22 acts through a relatively large radius R1** in applying force to the carriage. With a constant torque motor, this larger radius results in a relatively low force applied to the carriage, which force is all that is required to overcome the friction of the carriage on its guideways, as discussed above.

The upper surface of cam 34 has a step cut therein along a line **34*b* (FIG. 1), so that as drum 26 and cam 34 rotate in a counterclockwise direction from the position shown in FIG. 1, cable 22 will wind in slot 34*a* until it reaches edge 34*b*, at which time cable 22 will ride along edge 34*b*, as shown in FIG. 4. At this point, cable 22 will then be acting through the relatively short radius R2, so that with the constant torque motor, a relatively large force will be applied to cable 22 and the carriage and head arm assembly. The location of edge 34*b* on cam 34 is selected of course so that cable 22** reaches this edge just as the sloping surfaces of the head arms are approaching the cam members which unload the heads. Thus, the relatively large force is applied to the carriage assembly at the time when it is required to overcome the significant resistance encountered in the head unloading operation.

For proper function, the carriage 12 should not rub on any surface. In order to keep the cable 22 in the middle of the slot 20 without touching the carriage 12, there is provided a cable guide 48. This cable guide 48 is coupled to the frame member 30 by a pair of screws 50 or the like and forces the cable 22 to go through its round slot, being bent around the slot bottom.

Two additional important elements of the present invention reside in the pivotable interlock arm 150 and the solenoid 52 which controls operation of the same. Although the solenoid 42 is shown disposed in the structure of the mechanical interlock assembly, it is preferable to locate the solenoid in spaced relation to the structure to avoid deleterious effects of temperature change and to permit ease of adjustment and the like. To effect pivoting of the arm 150, a transverse support rod or pin 54 extends across a narrow slot defined by sidewall portions 56, the pin defining a pivot axis for the interlock arm 150.

A coil spring 58 surrounds the rod 54, has ends 60 biased against cover plate 62 and an intermediate loop portion 64 underlying the pivotable arm on the opposite side of the pivot axis, such that the coil spring provides a desired torsion bias force, tending to rotate the arm clockwise about the pivot pin 54 as seen in FIGS. 2, 3 and 4. The sidewalls 56 are further provided with narrow slots 66, which receive the lateral edges of the rectangular glider 24. The glider carries a central rectangular opening 68 which in turn receives a pin 70, the head end 72 of which acts as a stop for the pin 70. The pin 70 is coupled, at its inner end, to the cable 22 such that the bias of the negator motor tends to drive the glider 24 from the right to left and starts moving in the direction to home position upon release by the interlock arm 150. The outer end of the interlock arm 150 terminates in the glider latch portion 74, cooperating with a detent cam portion 76, which defines the detent for glider 24. The home position end 78 of the interlock arm 150 curves upwardly having a sloped upper surface 80, and its edge serves as a carriage latch, which in FIG. 2 abuts the detent notch 18 within the lower end of the ramp portion 14 of the carriage mechanism. The upper hollow curve provides a cam so that the arm 150 is pushed down by the detent cam 76.

While the torsion coil spring 58 tends to bias the arm clockwise, about the pivot pin 54, the solenoid 52 acts when energized to rotate the arm counterclockwise against the bias of the spring. A slot 88 in the arm 150 receives a bolt 90 extending transversely, which couples an actuator shaft 86 connected to the solenoid to the interlock arm 150, such that the arm may rotate upon reciprocation of the solenoid actuator shaft.

The operation of the mechanical interlock mechanism of the present invention may be best seen by reference to FIGS. 2, 3 and 4, in sequence. As illustrated in FIG. 2, with the carriage in the home position, power on and the solenoid off, the torsion spring 58 pushes the arm 150 clockwise until the end 80 takes its support from the notched bottom 151, the height of which is such that the opposite end 74 of the arm 150 is not allowed to unlatch the glider 24 loose. The solenoid is de-energized at all times when the disk pack is not rotating at the proper speed or when the logic of the machine so dictates. The carriage is then latched in the home position so that the carriage latch portion 78 of the arm engages the detent notch 18, preventing inadvertent movement of the carriage 12 from left to right. Thus, the carriage 12 is prevented from being pushed by any means into the disk pack (to the right) since the ramp portion 14 is obstructed by the presence of the latching portion 78 of the arm.

FIG. 3 illustrates the position of the arm 150 after the solenoid has been energized. Since the solenoid is stronger than the torsion spring 58, the bias of the spring 58 is overcome and the interlock arm 150 rotates counterclockwise to the position shown, until the flat bottom 153 of the glider prevents further rotation of the arm 150. This causes the latching portion 78 of the interlock arm 150 to clear under the detent notch 18, releasing the carriage 12 and allowing the linear motor to drive the same from left to right as indicated by arrow 100. Since the cable 22 rides freely through the slot 20 within the ramp portion 14, there is no restriction by the interlock mechanism on normal reciprocating movement of the carriage, and bi-directional movement continues under normal operation of the transducer apparatus unless power failure occurs. Of course, counterclockwise rotation of the arm merely insures continued latching of the glider 24 by the right-hand latching portion 74 of the arm.

Upon failure of power or for any other cause, de-energization of the linear motor may leave the carriage at any position along its bi-directional path. If in fact the reciprocating carriage 12 is at a position where the ramp portion 14 is to the right of the upwardly sloped carriage latching portion 78 of the interlock arm and the solenoid de-energized, the arm is free to rotate clockwise as indicated by arrow 102 under the bias of the torsion spring 58 so as to immediately release glider 24. The glider 24 is pulled along the paired slots 66 and moves from right to left as indicated by the arrow 104 until its inner end 98 impacts the leading edge 94 of the ramp portion to drive the carriage from right to left as indicated by the larger arrow 106. Regardless of the position of the carriage, eventually the glider will reach the leading edge or surface 94 of the carriage ram portion to push the carriage toward the home position as shown in FIG. 4. Of course, if in fact the force by negator motor on cable 22 is sufficient, the sloped detent cam 16 will ride over the curved surface 80 of the interlock arm to move the carriage into the fully home position and latch the carriage into this position by having the latching end 78 fall into detent notch 18 as illustrated in FIG. 2. To cushion the effect on glider 24 and cable 22 of the impact with carriage 12. spring elements 105 may be incorporated in glider 24. Additionally, the contacting face 98 of glider 24 may have a shock absorbing coating applied thereto to further cushion this impact.

Thus, in accordance with this invention, the constant torque negator motor provides a relatively lower force while cable 22 is winding in slot 34*a* at radius R1 to drive the carriage prior to unloading the heads. As the carriage approaches the home position, cable 22 drops along edge 34*b*, thus decreasing the effective radius to R2 for the negator motor and increasing the force supplied therefrom. This increased force is utilized to drive the sloping portions of the transducer arms through the camming action discussed above to unload the transducers from the disk surfaces.

What is claimed is:

1. A mechanical interlock mechanism for controlling the positioning of a movable carriage comprising:

means for driving said carriage bi-directionally from and to a home position;

a pivotable arm;

spring means urging said arm to pivot in one direction and into the path of said moving carriage;

electrical means for pivoting said arm in opposition to said spring means, said arm engaging said carriage upon de-energization of said electrical means to maintain said carriage in home position;

glider means for urging said carriage toward home position when said electrical means is de-energized and said carriage is away from home position;

motor means for storing energy when said carriage is moved away from home position; and cable means coupling said motor means to said glider means, said cable being unwound when said carriage moves away from home position, and being wound up when said carriage returns to home position.

2. Apparatus in accordance with claim 1 in which said motor means includes means for applying a varying restoring force to said cable means to return to said carriage to home position, said force varying as a function of carriage position.

3. Apparatus in accordance with claim 2 wherein said restoring force applying means includes means for producing a first restoring force when said carriage is at positions remote from the home position and a second restoring force larger than said first force when said carriage approaches the home position.

4. Apparatus in accordance with claim 3 in which said motor means comprises a constant torque rotary motor, and said cable means is coupled to said force producing means first radius when said carriage is at positions remote from the home position to provide said first restoring force, and said cable means is coupled to said force producing means at a second radius smaller than said first radius when said carriage approaches the home position to provide said second restoring force.

5. The mechanical interlock mechanism as claimed in claim 1, further comprising means for supporting said glider means for movement along the path of said carriage and for impact therewith to drive said carriage toward home position, and wherein said arm is positioned with respect to said glide so as to engage said glider during energization of said solenoid to prevent movement of the same toward said carriage during normal bi-directional movement of said carriage.

6. The mechanical interlock mechanism as claimed in claim 5 further comprising a rotatable drum, said cable means being coupled at one end to the drum and at the other end to said glider, and said motor means tending to bias said drum into cable windup position, whereby movement of said carriage away from home position and into contact with said glider, causes the glider to move away from carriage home position to move the same into glider detent position and against the bias of said motor means.

7. The mechanical interlock mechanism as claimed in claim 6 wherein said motor means comprises a spring tending to wind said cable means about said drum.

8. The mechanical interlock mechanism as claimed in claim 6 further comprising opposed slots for supporting said glider means for movement parallel to, but below, said cariage and generally in line with said carriage ramp portion, said ramp portion including a longitudinal opening formed therein, allowing said cable means to pass freely therethrough, and said interlock mechanism further includes a fixed guide member between said drum and said carriage home position for guiding said cable means during bi-directional movement of said glider.

9. The mechanical interlock mechanism as claimed in claim 8, wherein said cable drum includes a peripheral groove of relatively large radius upon which said cable means is wound during intial movement of said glider when released by said interlock arm and a smaller radius peripheral groove for winding up a portion of said cable means during final movement of said carriage into home position.

10. The mechanical interlock mechanism as claimed in claim 1, wherein said pivotable arm underlies said moving carriage such that it is pivotable intermediate of its ends, and one end engages said carriage to maintain the same at home position when said solenoid is de-energized, and said other end engages said glider means when said solenoid is energized to maintain said glider out of contact with said carriage.

11. The mechanical interlock mechanism as claimed in claim 10 wherein said carriage includes a ramp portion depending therefrom including an inclined surface facing home position and a detent notch facing the opposite direction, and the carriage engageable end of said pivotable interlock arm has a curved surface facing said ramp portion allowing said ramp portion to ride over said arm when moving to full home position to cause said end of said arm to engage said detent notch and maintain said carriage in home position until said solenoid is re-energized.

12. The mechanical interlock mechanism as claimed in claim 11, wherein said glider means carries a depending projection forming a glider detent, and the end of said arm most remote from carriage home position is so configured as to engage said glider detent projection when the opposite end of said interlock arm engages the detent notch of said carriage ramp portion, and remains in engagement therewith when said solenoid is energized and rotates said interlock arm to a position releasing the same from said carriage ramp portion detent notch to allow said carriage is moved bi-directionally.

References Cited

UNITED STATES PATENTS

| | | | |
|---|---|---|---|
| 2,478,138 | 8/1949 | Tobias | 74—2 |
| 3,262,323 | 7/1966 | Faills et al. | 74—2 |

MILTON KAUFMAN, Primary Examiner